United States Patent [19]

Mainord

[11] 4,192,942

[45] Mar. 11, 1980

[54] EMULSIFIABLE ETHYLENE/CARBON MONOXIDE COPOLYMER WAXES

[75] Inventor: Kenneth R. Mainord, Longview, Tex.

[73] Assignee: Eastman Kodak Company, Rochester, N.Y.

[21] Appl. No.: 938,121

[22] Filed: Aug. 30, 1978

[51] Int. Cl.² ............................................. C08F 10/02
[52] U.S. Cl. ............................... 260/597 R; 528/482; 528/490; 528/392
[58] Field of Search ....................... 528/392, 482, 490; 260/683 R, 683.1

[56] References Cited

U.S. PATENT DOCUMENTS

| 2,495,286 | 1/1950 | Brubaker | 528/392 |
| 3,780,140 | 12/1973 | Hammer | 528/392 |

*Primary Examiner*—Lester L. Lee
*Attorney, Agent, or Firm*—Clyde L. Tootle; Daniel B. Reece, III

[57] ABSTRACT

This invention is concerned with emulsifiable ethylene/carbon monoxide copolymer waxes prepared by low temperature solid phase oxidation of ethylene/carbon monoxide copolymers. These waxes have a desirable combination of properties including high viscosity, excellent color, and good emulsifiability.

20 Claims, No Drawings

EMULSIFIABLE ETHYLENE/CARBON MONOXIDE COPOLYMER WAXES

This invention relates to emulsifiable ethylene/carbon monoxide copolymer waxes made by low temperature oxidation in the solid state of ethylene/carbon monoxide copolymers.

It is known in the art that polyethylenes can be converted to emulsifiable waxes by oxidation in the form of a powder at temperatures below their softening points; note British Pat. No. 997,135. However, this process until now has been considered only practical for high density polyethylenes which have softening points generally about 120° C. At this temperature emulsifiable high density polyethylene waxes with acid numbers from 25 to 50 can be obtained in from about 16 to 36 hours. Details of the preparation of such high density waxes is given in British Pat. No. 997,135.

Polyethylenes which have lower densities and lower softening points require correspondingly lower oxidation temperatures and many days are required to reach a degree of oxidation at which the product will emulsify. For example, ordinary low density polyethylene in the form of 18 mesh powder requires a temperature of about 90° C. for oxidation. Temperatures much above this causes softening and agglomeration of the powder or even complete melting. At about 90° C., the oxidation rate is so slow it can take from 15 to 25 days to obtain a wax product with an acid number of about 20. For this reason, it has heretofore been considered impractical to produce emulsifiable waxes by oxidation of low density polyethylenes in the solid phase.

It has now been discovered that ethylene/carbon monoxide emulsifiable waxes similar to polyethylene can be made by oxidation of ethylene/carbon monoxide copolymers in the solid phase. The presence of small amounts of carbonyl groups in the ethylene/carbon monoxide copolymers apparently makes such polymers more susceptible to oxidation and speeds up the overall reaction rate relative to polyethylene which contains no carbonyl groups. A typical low density polyethylene (having a density of about 0.918 to about 0.925, a melt index of about 7.2 to about 0.3 and an inherent viscosity of about 0.84 to about 0.95) oxidizes very slowly at 90° C., taking 450 hours to reach an acid number of about 20. In contrast, incorporation of carbon monoxide up to about 8 weight percent in an ethylene/carbon monoxide polymer increases the overall rate of oxidation dramatically (about 110 hours to reach 20 acid number). In general, the higher the level of CO in the copolymer the more rapidly the polymer will oxidize.

For the purposes of this invention, ethylene/carbon monoxide copolymers mean copolymers of ethylene and carbon monoxide which range in carbon monoxide content from 1 to 18 weight percent (determined by infrared analysis) and having a melt index of about 0.1 to about 500 and a density of about 0.92 to about 0.98. Such copolymers have physical properties which approximate those of low density homopolymers of ethylene. These ethylene/carbon monoxide copolymers can be made by high pressure polymerization techniques similar to those used for commercial low density polyethylenes.

The emulsifiable waxes obtained by the low temperature solid phase oxidation of the ethylene/carbon monoxide copolymers have a desirable overall combination of properties not easily obtained by other oxidation methods. In particular, oxidized waxes with higher viscosities are obtained than can be readily prepared by the usual melt oxidation methods. Oxidation of both high density and low density polyethylenes in the melt phase is well known; not U.S. Pat. Nos. 3,434,993 and 3,756,999. Generally the melt phase oxidation works well only for relatively low viscosity polyethylenes. The reasons for this are discussed in some detail in U.S. Pat. No. 3,756,999. In addition to the high viscosities, the emulsifiable ethylene/carbon monoxide waxes of the present invention also have excellent color and very good emulsifiability.

In practice, the oxidation of the ethylene/carbon monoxide copolymers is carried out on the copolymer in powdered form having a particle size of from about 6 mesh to about 300 mesh, preferably having a particle size around 18 mesh. Oxidation time is somewhat dependent on the actual particle size, oxidation rate increasing with decreasing particle size. An oxidation promoter, such as an organic peroxide catalyst such as, for example, benzoyl peroxide or ozone, is added to the polymer in small amounts, such as from about 0.1 to about 5 weight percent, preferably about 0.5 to about 2 weight percent, to decrease the induction period and increase the oxidation rate. The peroxide can be dissolved in a low boiling organic solvent prior to mixing it with the powdered copolymer. Evaporation of the solvent leaves an intimate coating of the catalyst on the surface of the polymer. The general procedure for carrying out the oxidations was to place the copolymer powder in a forced draft oven at about 75° C. to about 95° C., preferably about 90° C. At temperatures below 75° C., the rate of oxidation is so low as to be impractical for commercial operations. At temperatures greater than 95° C., the particles tend to soften and melt and cause the particles to fuse into a viscous mass which makes the reaction difficult to control. The oxidation is generally carried out over a period of at least 24 hours. Less than 24 hours, the acid number is generally not high enough to provide an emulsifiable wax. The wax should have an acid number of from 10 to about 80, preferably about 24 to about 40. These emulsifiable waxes have low color (Gardner color of 1 to 2), a melt viscosity of about 2,000 to 40,000 cp. (Brookfield viscosity at 125° C.), preferably 5,000 to 20,000 cp., and a ring and ball softening point of about 95° C. to about 120° C., a preferably 100° C. to 115° C. Such oxidized ethylene/carbon monoxide copolymer waxes provide an easily emulsifiable wax having a good combination of wax properties. The oxidation rate was monitored by removing small samples from the oven periodically and measuring the acid number.

The various physical properties of my novel product were determined as follows:
(1) Melt Index—ASTM D1238-57T
(2) Density—ASTM D1505-57T
(3) Softening point (ring and ball)—ASTM D36-26
(4) Color—Gardner scale
(5) Viscosity—Brookfield viscosity at 125° C.
(6) The acid number is determined in accordance with ASTM D1386-59 with the following modifications:
  a. Xylene is substituted for the ethanol toluene mixture as the sample solvent.
  b. A 0.05N sodium hydroxide in methanol solution is substituted for the 0.1N aqueous solution of sodium hydroxide.

c. The sample size is increased from 1-2 grams to 4.5 to 5.5 grams, and the weighing accuracy is changed from 0.001 to 0.0001 grams.

This invention can be further illustrated by the following examples of preferred embodiments thereof, although it will be understood that these examples are included merely for purposes of illustration and are not intended to limit the scope of the invention unless otherwise specifically indicated.

EXAMPLE 1

Five hundred grams of antioxidant free low density polyethylene polymer (18 mesh) having a density of 0.917 and a melt index of 7.0 was coated with 0.5 weight percent of benzoyl peroxide and placed in a recirculating air oven at 90° to 91° C. Samples were periodically withdrawn and measured for acid number as an indication of the degree of oxidation. The increase in acid number is shown as a function of time in Table I. The oxidation rate was extremely slow, evidenced by the fact that it took 330 hours to reach an acid number of only 11.5.

EXAMPLE 2

The experiment of Example 1 was repeated except that an antioxidant free low density polyethylene powder (18 mesh) having a density of 0.925 and a melt index of 0.3 was oxidized. The increase in acid number with time is shown in Table I. The oxidation rate was identical to the polyethylene in Example 1.

Table I

| Oxidation of Low Density Polyethylene Powder | | |
|---|---|---|
| Polymer | Hours of Oxidation | Acid No. |
| Polyethylene, Antioxidant free, having a Melt Index = 0.3; a density = 0.925 | 0.0 | 0.0 |
| | 93.0 | 2.8 |
| | 234.0 | 7.2 |
| | 330.0 | 11.5 |
| | 474.0 | 21.0* |
| Polyethylene, Antioxidant free, having a Melt Index = 7.0; a density = 0.918 | 0.0 | 0.0 |
| | 93.0 | 1.4 |
| | 234.0 | 7.2 |
| | 330.0 | 11.5 |
| | 474.0 | 23.1± |

*Brookfield viscosity at 125° C. for the oxidized product at this acid number was 12,250 cp
±Brookfield viscosity at 125° C. for the oxidized product at this acid number was 10,250 cp

EXAMPLE 3

Five hundred grams of an antioxidant free ethylene/carbon monoxide copolymer (18 mesh) having a density of 0.926, a melt index of 175 and a carbon monoxide content of 3.1 weight percent was coated with 0.5 weight percent benzoyl peroxide and oxidized in a recirculating air oven at 90° to 91° C. Samples were periodically withdrawn and measured for acid number. The extent of oxidation with time is tabulated in Table II. After 236 hours, the sample was removed from the oven. The product was a white powder with a Gardner color of 1 in the melt, a Brookfield viscosity of 3,125 cp at 125° C., a density of 0.952, a ring and ball softening point of 102.5° C. and an acid number of 22.6.

Table II

| Oxidation Rate for Ethylene/CO Copolymers | | | |
|---|---|---|---|
| Ethylene/CO Copolymer Melt Index at 190° C. | % CO | Hours of Oxidation | Acid Number |
| 400 MI | 8.5 | 0 | 0.0 |
| | | 40 | 7.6 |
| | | 72 | 12.7 |
| | | 136 | 23.5 |
| 260 MI | 7.3 | 0 | 0.0 |
| | | 40 | 9.3 |
| | | 72 | 14.2 |
| | | 136 | 24.0 |
| | | 160 | 27.7 |
| 310 MI | 3.4 | 0 | 0.0 |
| | | 40 | 5.7 |
| | | 72 | 7.6 |
| | | 136 | 14.7 |
| | | 192 | 21.2 |
| | | 236 | 26.9 |
| 175 MI | 3.1 | 0 | 0.0 |
| | | 40 | 4.0 |
| | | 72 | 6.8 |
| | | 136 | 12.7 |
| | | 192 | 17.0 |
| | | 236 | 22.6 |

EXAMPLE 4

To a 300 ml stirred Parr reactor was charged 40 grams of oxidized ethylene/carbon monoxide copolymer from Example 3, 120 grams of water, 1.2 grams of KOH (86 percent purity) and 12 grams of a conventional nonionic emulsifier (Iconol A-26). The reactor was sealed, heated to 150° C. and maintained for 30 minutes with stirring. Then the emulsion was cooled rapidly by passing cold water through cooling coils inside the Parr reactor to about 50° C. and removed from the Parr reactor. The emulsion was excellent and had a percent transmission of 74 percent when diluted to 1 percent solids. The transmission was measured on a Spectronic 20 spectrophotometer at 525 millimicrons using water as the reference. Emulsions with percent transmittances of 70 percent or greater are translucent and have a high degree of clarity. This results from the very small particle size characterized by the emulsion.

EXAMPLE 5

An antioxidant free ethylene/carbon monoxide copolymer (18 mesh) having a density of 0.936, a melt index of 310, and a carbon monoxide content of 3.4 weight percent was coated with 0.5 weight percent benzoyl peroxide and oxidized in a recirculating air oven at 90° to 91° C. The rate of oxidation with time is tabulated in Table II. After 236 hours the sample was removed from the oven. The product had a Brookfield viscosity of 2,750 cp at 125° C., a density of 0.955, a ring and ball softening point of 104° C., and an acid number of 26.9. A nonionic emulsion prepared in the manner described in Example 4 gave a percent transmission of 76 percent at 1 percent solids.

EXAMPLE 6

The experiment of Example 1 was repeated except that an antioxidant free ethylene/carbon monoxide copolymer (18 mesh) having a density of 0.956, a melt index of 260, and a carbon monoxide content of 7.3 percent was coated with 0.5 percent benzoyl peroxide and oxidized in a recirculating air oven at 90° to 91° C. The oxidation with time is given in Table II. After 160 hours, the samples were removed from the oven. The product had an acid number of 27.7, a Brookfield viscosity of 3,625 cp at 125° C., a density of 0.976 gram per cubic centimeter, a Gardner color of 1 in the melt, and a ring and ball softening point of 105.5° C. A nonionic emulsion prepared in the manner of Example 4 gave a percent transmission of 87 percent at 1 percent solids.

Table III

Emulsifiable Ethylene/Carbon Monoxide Copolymers

| Run | Ethylene/CO Copolymer Melt Index at 190° C. | % CO | Oxidation Time, hr. | Acid Number | Brookfield Visc at 125° C., cp | Anionic Emulsion % T | Ring and Ball Soft Pt. °C. | Gardner Color |
|-----|---|---|---|---|---|---|---|---|
| 1 | 400 | 8.5 | 136 | 23.5 | — | — | | |
| 2 | 310 | 3.4 | 236 | 26.9 | 2,750 | 76 | 104.0 | 1 |
| 3 | 175 | 3.1 | 236 | 22.6 | 3,125 | 74 | 102.5 | 1 |
| 4 | 260 | 7.3 | 160 | 27.7 | 3,625 | 87 | 105.5 | 1 |

The solid phase oxidation of low density polyethylene is not practical due to the extremely low oxidation rates at the low temperatures necessary to prevent melting of the polymer. However, the ethylene/carbon monoxide copolymers oxidize at a much faster rate which makes the production of high viscosity emulsifiable waxes feasible. The emulsifiable ethylene/carbon monoxide copolymer waxes form excellent substitutes for carnauba wax, for example, but are superior thereto in that they are substantially tougher and more flexible. These novel waxes will disperse to form emulsifiable self-polishing waxes and take an extremely high polish.

The invention has been described in detail with particular reference to certain preferred embodiments thereof, but it will be understood that variations and modifications can be effected within the spirit and scope of the invention.

I claim:

1. A process for the production of emulsifiable ethylene/carbon monoxide copolymer wax which comprises oxidizing an ethylene/carbon monoxide copolymer having a melt index of about 0.1 to about 500 and a density of about 0.92 to about 0.98 in the solid phase at a temperature of about 75° C. to about 95° C. until said emulsifiable copolymer wax has an acid number of at least 10.

2. Process according to claim 1 wherein said ethylene/carbon monoxide copolymer contains from 1 to 18 weight percent carbon monoxide.

3. Process according to claim 2 wherein said ethylene/carbon monoxide copolymer has a crystalline melting point of 95° C. to 110° C.

4. Process according to claim 3 wherein said oxidation is carried out but in the presence of 0.1 to 5 weight percent of an organic peroxide catalyst.

5. Process according to claim 3 wherein said oxidation is carried out in the presence of 0.1 to 5 weight percent of ozone.

6. Process according to claim 4 wherein said emulsifiable copolymer wax has an acid number of from about 10 to about 80.

7. A process for the production of emulsifiable ethylene/carbon monoxide copolymer wax which comprises oxidizing an ethylene/carbon monoxide copolymer having a melt index of about 0.1 to about 500 and a density of about 0.92 to about 0.98 in the solid phase at a temperature of about 90° C. until said emulsifiable copolymer wax has an acid number of at least 10.

8. Process according to claim 7 wherein said ethylene/carbon monoxide copolymer contains from 1 to 18 weight percent carbon monoxide.

9. Process according to claim 8 wherein said ethylene copolymer has a crystalline melting point of 95° C. to 110° C.

10. Process according to claim 9 wherein said oxidation is carried out in the presence of about 0.5 weight percent of an organic peroxide catalyst.

11. Process accordings to claim 9 wherein said oxidation is carried out in the presence of about 2 weight percent of ozone.

12. Process according to claim 9 wherein said emulsifiable copolymer wax has an acid number of from about 10 to about 80.

13. An emulsifiable ethylene/carbon monoxide copolymer wax containing about 1 to about 18 weight percent carbon monoxide, an acid number of from about 10 to about 80, a Gardner color of from 1 to 2, and a ring and ball softening point of about 95° C. to about 120° C., and a melt viscosity of at least about 2,000 to 40,000 centipoise (Brookfield at 125° C.).

14. An emulsifiable ethylene/carbon monoxide copolymer wax according to claim 13 wherein said acid number is about 24 to about 40.

15. An emulsifiable ethylene/carbon monoxide copolymer wax according to claim 14 wherein said melt viscosity is about 5,000 to about 20,000 centipoise (Brookfield at 125° C.).

16. An emulsifiable ethylene/carbon monoxide copolymer wax according to claim 15 wherein said ring and ball softening point is about 100° C. to about 115° C.

17. An emulsifiable ethylene/carbon monoxide copolymer wax containing about 5 to about 10 weight percent carbon monoxide, an acid number of from about 10 to 80, a Gardner color of from 1 to 2, and a ring and ball softening point of about 95° C. to about 120° C., and a melt viscosity of about 5,000 to about 20,000 centipoise (Brookfield at 125° C.).

18. An emulsifiable ethylene/carbon monoxide copolymer wax according to claim 17 wherein said acid number is about 24 to about 40.

19. An emulsifiable ethylene/carbon monoxide copolymer wax according to claim 18 wherein said melt viscosity is about 5,000 to about 20,000 centipoise (Brookfield at 125° C.).

20. An emulsifiable ethylene/carbon monoxide copolymer wax according to claim 19 wherein said ring and ball softening point is about 100° C. to about 115° C.

* * * * *